United States Patent
Magg et al.

(10) Patent No.: US 8,418,602 B2
(45) Date of Patent: Apr. 16, 2013

(54) BREWING CHAMBER FOR A COFFEE MACHINE, AND COFFEE MACHINE

(75) Inventors: Johann Magg, St. Georgen (DE); Andreas Mayr, Breitbrunn am Chiemsee (DE); Michael Steffl, Marquartstein (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 1879 days.

(21) Appl. No.: 10/587,226

(22) PCT Filed: Jun. 25, 2004

(86) PCT No.: PCT/EP2004/006928
§ 371 (c)(1),
(2), (4) Date: Jul. 24, 2006

(87) PCT Pub. No.: WO2005/072576
PCT Pub. Date: Aug. 11, 2005

(65) Prior Publication Data
US 2008/0210099 A1    Sep. 4, 2008

(30) Foreign Application Priority Data

Jan. 30, 2004   (DE) .......................... 10 2004 004 834

(51) Int. Cl.
*A47J 31/06* (2006.01)
(52) U.S. Cl.
USPC .............................. 99/295; 99/302 R; 99/315
(58) Field of Classification Search .................... 99/295, 99/315, 302 R
See application file for complete search history.

(56) References Cited

U.S. PATENT DOCUMENTS

| | | | | |
|---|---|---|---|---|
| 2,620,088 A | * | 12/1952 | Tellander | 220/318 |
| 3,030,874 A | * | 4/1962 | Fiori | 99/287 |
| 3,232,213 A | * | 2/1966 | Valente | 99/302 R |
| 3,561,349 A | * | 2/1971 | Endo et al. | 99/307 |
| 5,526,733 A | * | 6/1996 | Klawuhn et al. | 99/287 |
| 5,598,764 A | * | 2/1997 | Bambi | 99/295 |
| 5,649,472 A | | 7/1997 | Fond et al. | |
| 5,755,149 A | | 5/1998 | Blanc et al. | |
| 5,794,519 A | | 8/1998 | Fischer | |
| 6,009,792 A | * | 1/2000 | Kraan | 99/295 |
| 6,935,222 B2 | * | 8/2005 | Chen et al. | 99/302 R |
| 7,077,053 B2 | * | 7/2006 | Kraan | 99/295 |

FOREIGN PATENT DOCUMENTS

| | | |
|---|---|---|
| DE | 296 10 393 U1 | 8/1996 |
| DE | 197 01 033 | 7/1997 |
| EP | 0 761 148 | 3/1997 |
| EP | 1 050 258 | 11/2000 |
| WO | WO 01/15582 | 3/2001 |
| WO | WO 02/38016 | 5/2002 |
| WO | WO 02/082961 | 10/2002 |

* cited by examiner

*Primary Examiner* — Reginald L Alexander
(74) *Attorney, Agent, or Firm* — James E. Howard; Andre Pallapies

(57) ABSTRACT

A coffee machine brewing chamber for a coffee pad. Said brewing chamber comprises a top part that is provided with openings for the water which is delivered to the brewing chamber as well as a bottom part. The top part of the brewing chamber is embodied in a monolithic manner. The invention further relates to a coffee machine that is equipped with such a brewing chamber.

13 Claims, 7 Drawing Sheets

BREWING CHAMBER FOR A COFFEE MACHINE, AND COFFEE MACHINE

BACKGROUND

The invention relates to a brewing chamber of a coffee machine and a coffee machine.

Coffee machines operate according to different principles. The most common models are the so-called pressureless coffee machines such as are known, for example, from DE 296 10 393 U1. In these water flows from a storage container into an electrically heatable pipe. Particularly as a result of the evolution of steam in this pipe, heated water is then pushed through a riser to an outlet via which the heated water then drips into a coffee filter. The filter coffee, for example, can then flow from this coffee filter at atmospheric pressure into a pot.

In contrast, in espresso machines such as those disclosed in DE 197 01 033 A1, an elevated pressure prevails in the area of the coffee grounds. This is achieved by supplying water, for example, from a water container or another water supply to a pump which then supplies the water at high pressure via an electrically heatable area to a coffee grounds receiving device. This coffee grounds receiving device generally comprises a filter for receiving the coffee. In order to generate the high pressure in the area of the coffee grounds, during operation the coffee grounds receiving device is located in an area which is sealed towards the atmosphere, which is designated as a pressure chamber or brewing chamber.

In another type of coffee machine such as those described in WO 01/15582 or EP 1 050 258 A1, it is provided to first transfer the water for preparing the coffee from a water container into a heatable intermediate container. From this intermediate container the heated water is passed to a pump from which it is supplied at elevated pressure, for example 2 to 3 bar, to a coffee grounds receiving device. In this case, it is provided that the coffee is not introduced into the coffee grounds receiving device in loose form as coffee grounds but is inserted in a retainer in the form of a coffee pad, that is, in compacted form surrounded by filter paper. The retainer with a retainer cover via which water is supplied can form a sealed pressure chamber. At the same time, the retainer for the coffee pads is allocated a plurality of functions. Firstly, the retainer provides a sealing surface so that a pressure chamber can be formed. Moreover, the retainer has an outlet opening from which the coffee can emerge. Furthermore, the coffee pad should be mounted in the retainer in a manner such that flow through the coffee pad is not impeded. Such a coffee machine occupies an intermediate position between a conventional pressureless coffee machine and an espresso machine.

In the coffee machine disclosed in WO 01/15582 A1 the coffee pads are inserted in a lower portion of the brewing chamber and the upper portion of the brewing chamber can be folded onto the lower portion by the user by means of a hinge. An engaging connection between the two housing portions which are hinged relative to one another ensures sealing of the brewing chamber.

In the coffee machine known from EP 1 050 258 A1 the coffee pad is inserted in a pulled-out drawer and is then brought into the brewing position by pushing in the drawer. For sealing the brewing chamber, a brewing chamber upper portion is automatically moved over the coffee pad from above before the brewing process. After the brewing process, the coffee pads are automatically removed inside the coffee machine in a collecting container. Particularly as a result of the motor-driven components of the coffee machine, this is very complex and therefore expensive to produce.

SUMMARY

It is the object of the invention to improve a brewing chamber of a coffee machine. A further object of the invention is to provide a coffee machine with an improved brewing chamber.

This object is achieved by a brewing chamber of a coffee machine for a coffee pad, comprising a top part that is provided with openings for the water which is delivered to the brewing chamber and a bottom part, characterised in that the top part is embodied as monolithic. As a result of the monolithic design of this top part of the brewing chamber, production costs can be saved, especially if the top part of the brewing chamber has an outer seal.

According to one embodiment of the brewing chamber according to the invention, the top part has a centrally located elastic push-off element. This centrally located push-off element is appropriate since this arrangement corresponds to the symmetry of the preferably round coffee pad. Thus, the push-off force acts uniformly on the coffee pad and it is unlikely that this will adhere to the top part of the brewing chamber in any area. Furthermore, the central arrangement is useful since the openings for entry of water into the brewing chamber are preferably not centrally arranged but rather are located in a circular arrangement in the top part of the brewing chamber.

If the push-off element is substantially hemispherical in its stress-relieved state, as is provided according to one variant of the brewing chamber according to the invention, the push-off element can then be compressed similar to a rubber ball when pressing the coffee pad onto the top part of the brewing chamber and the coffee pad can be pushed off as a result of the transition to its stress-relieved state.

The push-off element can then be allocated properties which ensure secure push-off of the coffee pad from the top part of the brewing chamber in particular independently of the elastic properties and the other configuration of the top part of the brewing chamber if the push-off element is a star-shaped element having metal tongues as is provided according to a further embodiment of the brewing chamber according to the invention. According to a preferred embodiment of the brewing chamber according to the invention, the metal tongues are arranged between openings in the top part of the brewing chamber for entry of water so that they then impede the entry of water as little as possible.

According to a further preferred embodiment of the brewing chamber according to the invention, the top part has an elevated structure on the side facing the brewing chamber which structure can in particular comprise circularly arranged ribs provided with gaps. The elevated structure can in particular result in improved distribution of the brewing water and therefore improved usage of coffee. A further improvement in the distribution of the brewing water is obtained if the circularly arranged ribs are arranged concentrically and the gaps are arranged offset with respect to one another in the radial direction and/or the openings are arranged in the gaps.

According to a further variant of the brewing chamber according to the invention, the outer seal of the top part is executed as a tab-shaped circular lip and the top part comprises a plurality of supporting ribs for preventing any attachment of the tab-shaped lip to the top part. For improved assembly of the brewing chamber, it is provided according to a preferred variant of the brewing chamber according to the invention that the top part can be placed with the side facing away from the brewing chamber on the housing for the top part. Assembly is further simplified if that the side of the top part facing away from the brewing chamber comprises a projection whereby the top part can be engaged in the housing for the top part at lugs and in particular, if the projection is moulded on the top part.

The second object of the invention is achieved by a coffee machine fitted with a brewing chamber according to the invention.

BRIEF DESCRIPTION OF THE DRAWINGS

An exemplary embodiment of a coffee machine according to the invention and exemplary embodiments of brewing chambers according to the invention are shown as examples in the following schematic figures. In the figures.

DETAILED DESCRIPTION

Figure 1:
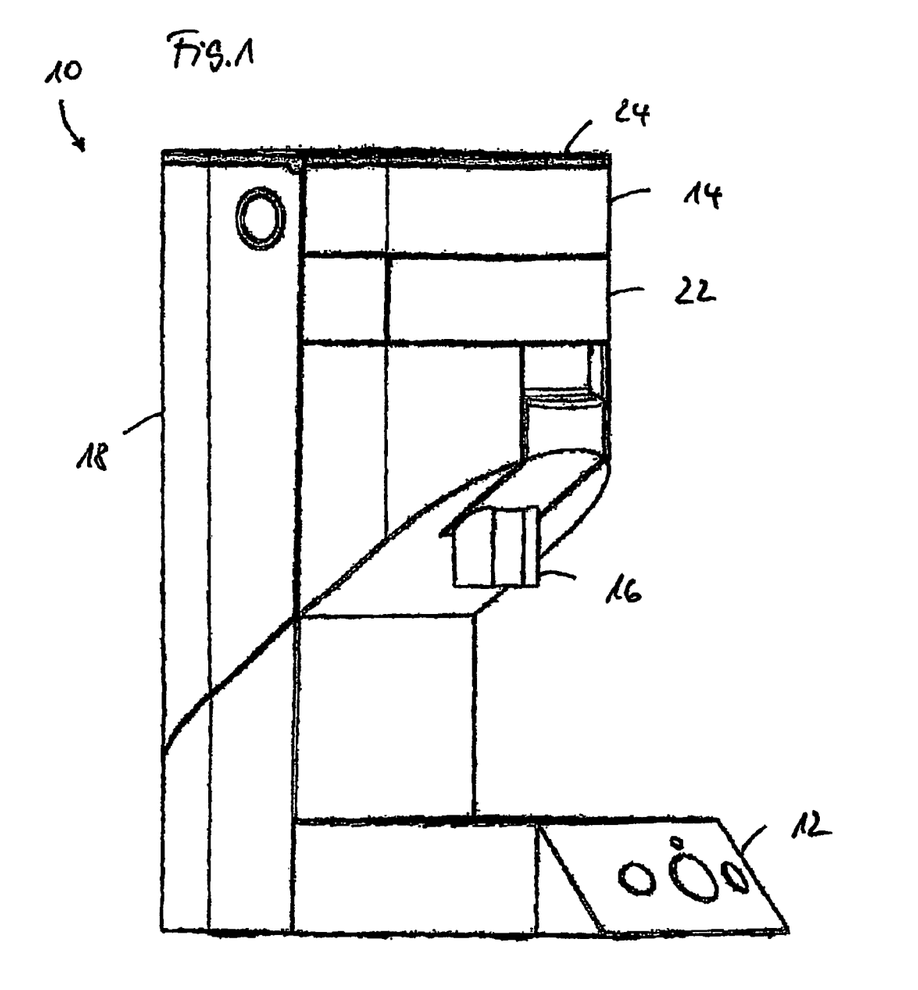
FIG. 1 is a perspective view of a coffee machine according to the invention.

FIG. 1 shows a perspective view of a coffee machine 10 according to the invention. The coffee machine 10 comprises a flat front portion 12 and a columnar rear assembly 14. Cups for removing coffee via an outlet 16 can be arranged on the front portion 12. A water container 18 is inserted in the rear assembly 14. Furthermore, a drawer 22 is provided for inserting coffee pads into the coffee machine 10.

Figure 2:
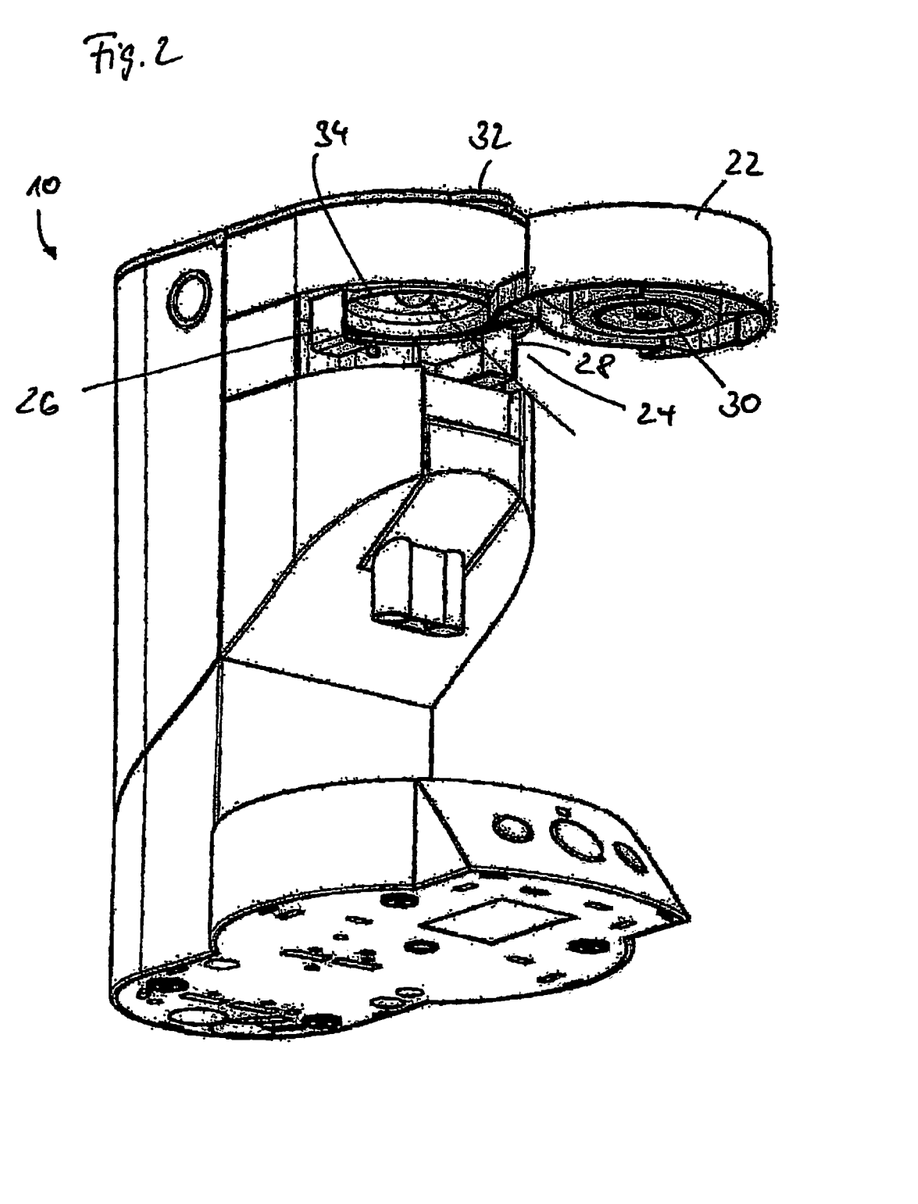
FIG. 2 is a perspective view of a coffee machine according to the invention with a first embodiment of a top part of the brewing chamber according to the invention.

FIG. 2 shows a perspective view of the coffee machine 10 with a first embodiment of a top part 34 of the brewing chamber according to the invention. In this view the drawer 22 is shown removed from the coffee machine 10. This exposes the view onto the slide-in area 24 for the drawer 22. Clamps 26, 28 can be identified in this slide-in area, these being provided to grip around or grip underneath a coffee pad retainer 30 located in the drawer 22 in the inserted state of the drawer 22. By actuating a lever 32 located on the upper side of the coffee machine 10, the clamps 26, 28 can be displaced vertically so that the coffee pad retainer 30 acting as the bottom part of the brewing chamber can be pressed against the top part 34 of the brewing chamber. The top part 34 of the brewing chamber or its inside comprises an elastic material, in the present exemplary embodiment a silicone, so that a pressure chamber which serves as the brewing chamber is formed by pressing the coffee pad retainer 30 onto the edge zone of the top part 34. Hot water enters into this brewing chamber under pressure from above through preferably a plurality of openings provided in the top part 34 of the brewing chamber. A substantially hemispherical push-off element 36 is provided at the centre of the top part 34 of the brewing chamber. This element is made of an elastic material like the remainder of the inside of the top part 34 and during the upward movement of the clamps 26, 28 this element is compressed by a coffee pad arranged in the coffee pad retainer 30 against the elastic force applied by the push-off element 36. If the coffee pad is to be removed after the brewing process, the clamps 26, 28 are moved downwards and with them the coffee pad retainer 30. In this case, as a result of its elasticity, the push-off element 36 can take on its original shape again whereby the coffee pad is pressed downwards. This prevents any attachment of the coffee pad on the top part 34 of the brewing chamber and it can easily be removed from the coffee machine 10 for disposal, together with the coffee pad retainer 30, by pulling out the drawer 22.

Figure 3A:
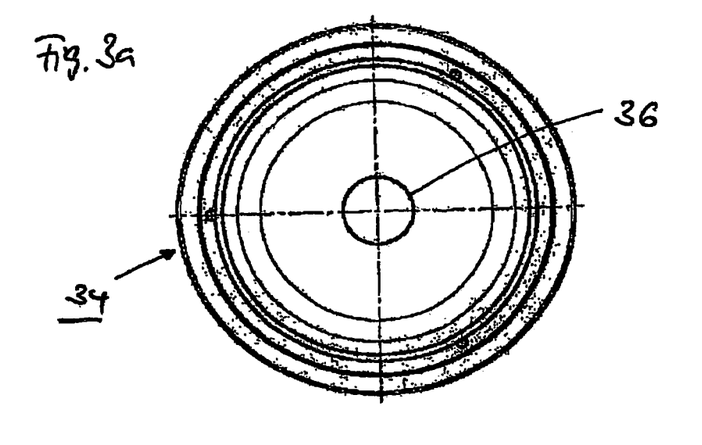
FIG. 3a is a plan view of the inside of the first embodiment of the top part of the brewing chamber according to the invention.
Figure 3B:
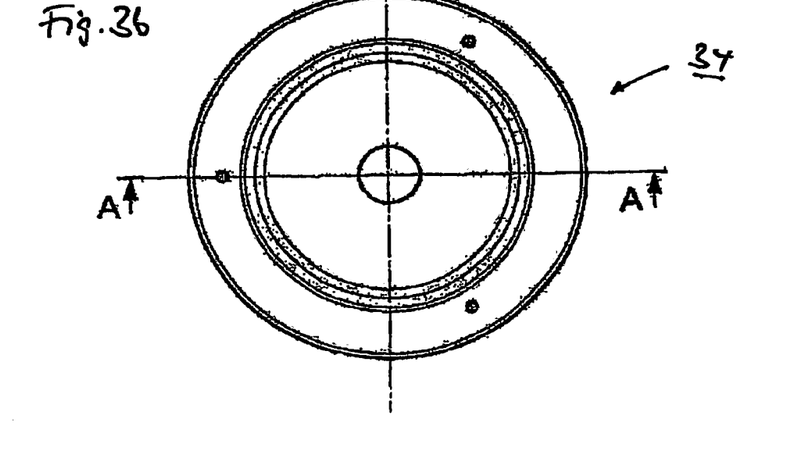
FIG. 3b is a plan view of the outside of the first embodiment of the top part of the brewing chamber according to the invention.
Figure 3C:
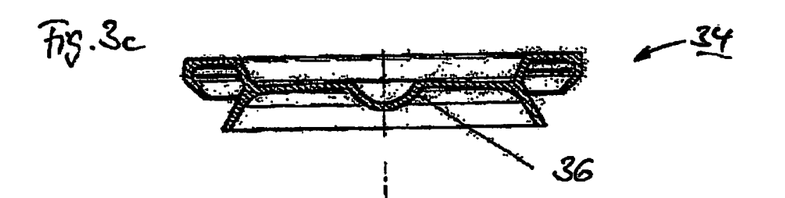
FIG. 3c is a sectional view along the intersecting plane identified as A in FIG. 3b through the first embodiment of the top part of the brewing chamber according to the invention.

FIG. 3a shows a plan view of the inside of the top part 34 of the brewing chamber, FIG. 3b shows a plan view of the top part 34 and FIG. 3c shows a sectional view along the intersecting plane identified as A in FIG. 3b through the top part 34. The arrangement and construction of the push-off element 36 can be seen here. FIG. 3c shows that the push-off element 36 is embodied as substantially hemispherical and is constructed in one piece with the remainder of the inside of the top part 34. It can thus be compressed by the coffee pad and it prevents the coffee pad from attaching to the inside of the top part 34 by taking on its original shape on lowering of the coffee pad retainer 30.

Figure 4:
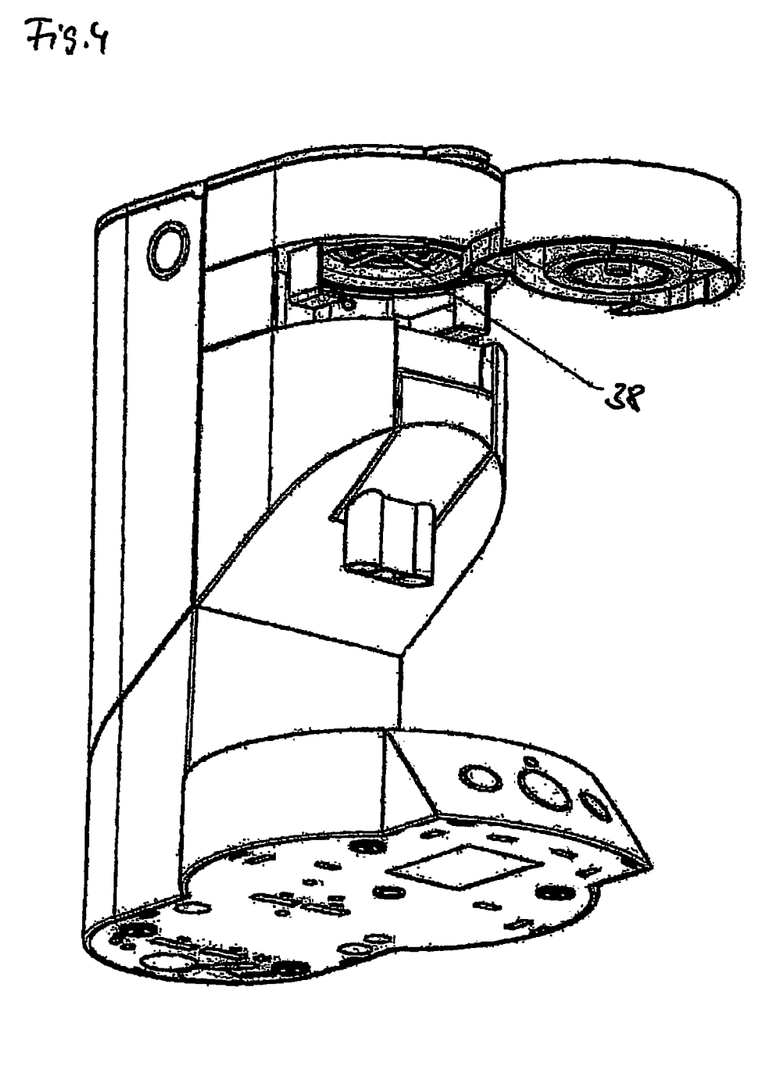
FIG. 4 is a perspective view of a coffee machine according to the invention with a second embodiment of a top part of the brewing chamber according to the invention.

FIG. 4 shows a perspective view of the coffee machine 10 with a second embodiment of a top part 34' according to the invention. This diagram is comparable to the diagram from FIG. 2. In contrast to the first embodiment of the top part 34 according to FIG. 2, in the second embodiment according to FIG. 4 the push-off element is embodied as a star-shaped push-off element 38. This star-shaped push-off element preferably consists of metal and as a result of the spring properties of the metal, it can act in a comparable manner to the push-off element 36 according to the first embodiment.

Figure 5A:
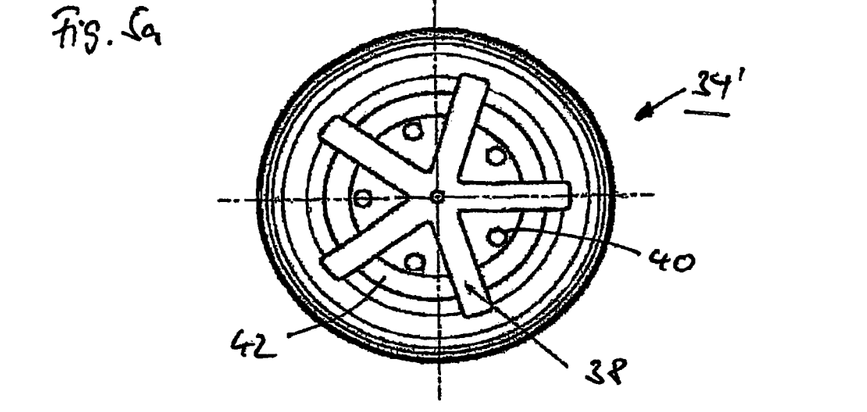
FIG. 5a is a plan view of the inside of the second embodiment of the top part of the brewing chamber according to the invention.
Figure 5B:
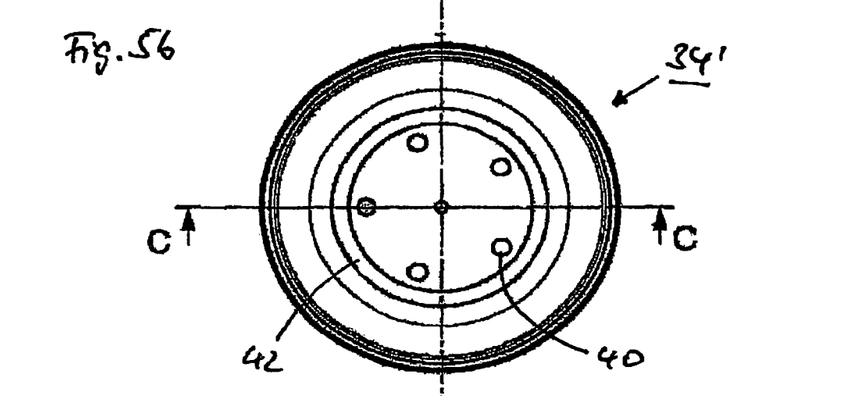
FIG. 5b is a plan view of the outside of the second embodiment of the top part of the brewing chamber according to the invention.
Figure 5C:
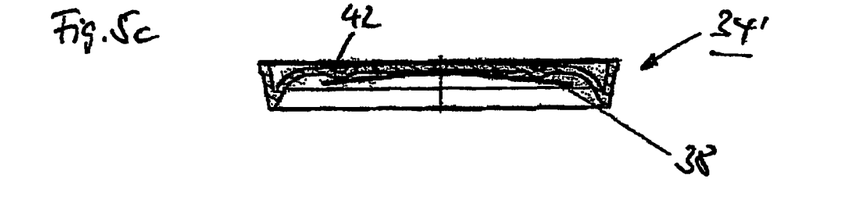
FIG. 5c is a sectional view along the intersecting plane identified as C in FIG. 5b through the second embodiment of the top part of the brewing chamber according to the invention.

FIG. 5a shows a plan view of the inside of the top part 34' of the brewing chamber, FIG. 5b shows a plan view of the top part 34' and FIG. 5c shows a sectional view along the intersecting plane identified as C in FIG. 5b through the top part 34'. In addition to the star-shaped push-off element 38, openings 40 can be seen, these being distributed uniformly along a circumference of a circle on the top part 34'. During preparation of coffee hot water enters through these openings 40 into the brewing chamber. The star-shaped push-off element 38 is suitably equipped with five metal tongues with regard to the arrangement of the five openings 40, these tongues being located between the openings 40. In this way, the water can flow into the brewing chamber unhindered by the push-off element 38. In the present case, the top part 34' or its inside is preferably made of silicone to provide a sealing edge zone to form the brewing chamber together with the coffee pad retainer 30. A bead 42 constructed in the elastic top part 34' can also be slightly compressed during pressing of the coffee pad onto the push-off element 38 so that in any case, sufficient space for upward movement of the coffee pad is provided in order to reliably seal the brewing chamber. However, it is also feasible that in its non-deformed state, the push-off element 38 is at a distance from the bead 42. In this case, the force required to strip the coffee pad can then be applied merely by the push-off element 38 at least towards the end of the downward movement of the tongues. The top part 34' fitted with a star-shaped push-off element 38 can also be implemented without a bead 42.

Figure 6:
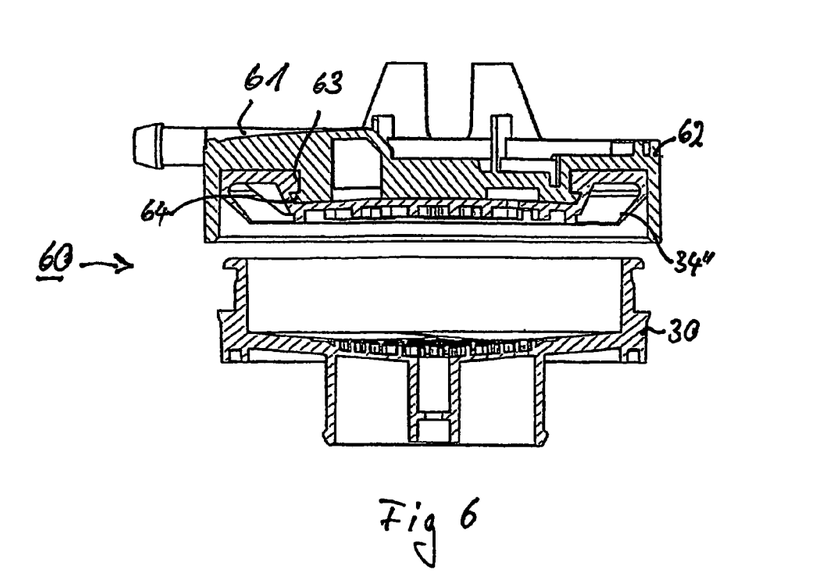
FIG. 6 is a cutaway view of a brewing chamber with a third embodiment of a top part of the brewing chamber according to the invention.
Figure 7A:
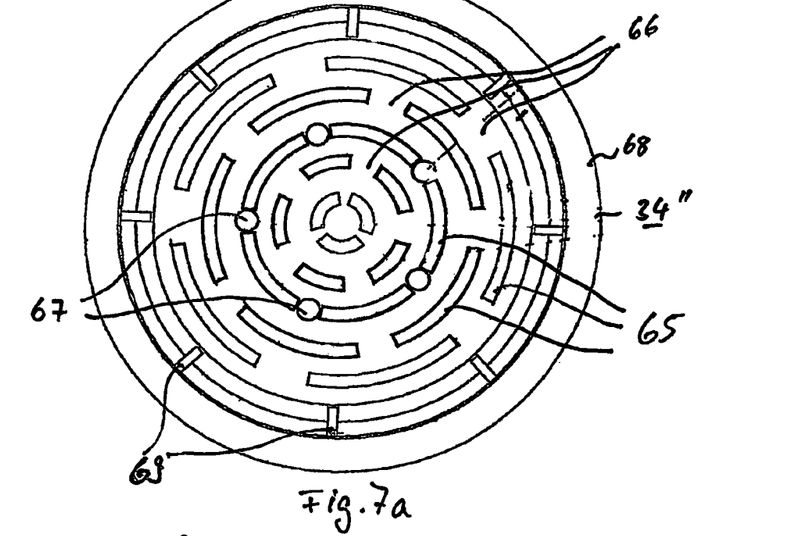
FIG. 7a is a plan view of the inside of the third embodiment of the top part of the brewing chamber according to the invention.
Figure 7B:
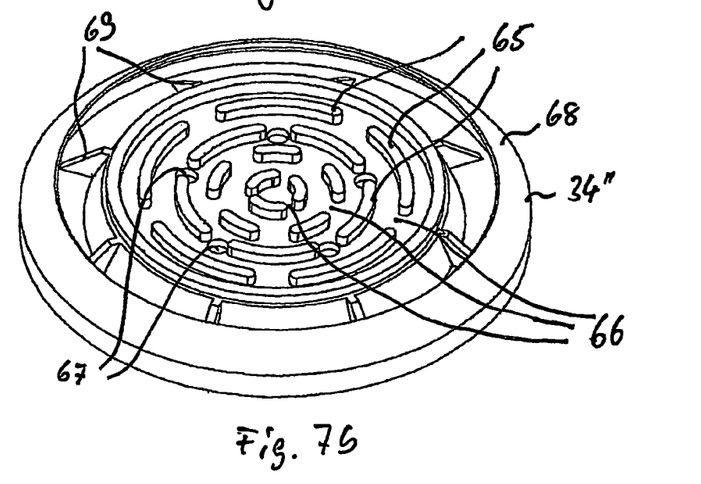
FIG. 7b is a perspective view of the third embodiment of the top part of the brewing chamber according to the invention.
Figure 7C:
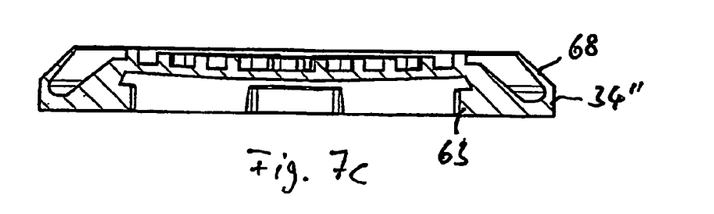
FIG. 7c is a sectional view of the third embodiment of the top part of the brewing chamber according to the invention.

FIG. 6 shows another brewing chamber 60 according to the invention with a third embodiment of a top part 34", FIG. 7a shows a plan view of the inside of the top part 34", FIG. 7b shows a perspective view of the top part 34" and FIG. 7c shows a sectional view of the top part 34".

FIG. 6 shows part of the water supply 61 to the brewing chamber 60, a housing 62 for receiving the top part 34" and the coffee pad retainer 30. The top part 34" is executed as circular and has a moulded-on projection 63 on the side facing away from the brewing chamber 60 whereby the top part 34" is engaged in the housing 62 at moulded lugs 64 to receive the top part 34".

As can be seen in particular from FIG. 7a to 7c, the top part 34" has an elevated structure on the side facing the brewing chamber 60 which in the present exemplary embodiment comprises circularly and concentrically arranged ribs 65 having gaps 66. In the present exemplary embodiment the gaps 66 are radially offset with respect to one another. In order that water coming from the water supply 61 can enter into the brewing chamber 60, the top part 34" is also provided with holes 67 which are arranged in some of the gaps 66.

In the present exemplary embodiment, the top part 34" is also made of silicone or rubber in order to thus provide a sealed edge zone to form the brewing chamber 60 together with the coffee pad retainer 30. In the present exemplary embodiment the sealing edge zone of the top part 34" is embodied as circular and comprises a tab-shaped lip-like outer sealing ring 68. In order to prevent attachment of the sealing ring 68 to the surface of the top part 34", in the present exemplary embodiment the top part 34" further comprises a plurality of supporting ribs 69.

The invention claimed is:

1. The brewing chamber of a coffee machine using a coffee pad, the brewing chamber comprising: a top part having openings allowing water to be delivered to the brewing chamber, and an outer seal; and a bottom part; wherein the top part is formed as a single monolithic piece of elastic material; wherein the top part has an elevated structure on the side facing the brewing chamber; and, wherein the openings are arranged in the gaps.

2. The brewing chamber according to claim 1, wherein the top part has a centrally located push-off element bulging downwardly from the top part and being formed from an elastic material, the push-off element providing a downwardly biasing force against the coffee pad to separate the coffee pad from the top part during removal of the coffee pad.

3. The brewing chamber according to claim 2, wherein the push-off element is substantially hemispherical in its stress-relieved state.

4. The brewing chamber according to claim 1, wherein the elevated structure includes circularly arranged ribs provided with gaps in the ribs.

5. The brewing chamber according to claim 4, wherein the circularly arranged ribs are arranged concentrically.

6. The brewing chamber according to claim 4, wherein the gaps are arranged offset with respect to one another in the radial direction.

7. The brewing chamber according to claim 1, wherein the outer seal of the top part is executed as a tab-shaped circular lip and the top part comprises a plurality of supporting ribs for preventing an inside surface of the tab shaped circular lip from sticking to other surfaces of the top part.

8. A brewing chamber of a coffee machine using a coffee pad, the brewing chamber comprising a top part having openings allowing water to be delivered to the brewing chamber, and a bottom part, wherein the top part is formed as a single integral piece,
wherein the top part has a centrally located push-off element bulging downwardly from the top part and being formed from an elastic material, the push-off element providing a downwardly biasing force against the coffee pad to separate the coffee pad from the top part during removal of the coffee pad, and
the push-off element includes a star-shaped element having metal tongues.

9. The brewing chamber according to claim 8, wherein the metal tongues are arranged between openings in the top part of the brewing chamber for entry of water.

10. The brewing chamber of a coffee machine using a coffee pad, the brewing chamber comprising: a top part having openings allowing water to be delivered to the brewing chamber, and an outer seal; and a bottom part; wherein the top part is formed as a single monolithic piece of elastic material; wherein a side of the top part facing away from the brewing chamber is adapted to be placed on a housing for the top part; wherein the side of the top part facing away from the brewing chamber comprises a projection whereby the top part is adapted to be engaged with a lug in the housing; and, wherein the projection is molded on the top part.

11. The coffee machine for use with coffee pads comprising: a housing; a brewing chamber disposed within the housing for receiving coffee pads and being at least partially formed by a top part and a bottom part, the top part being formed as a single monolithic piece of elastic material, having an outer seal, and having openings allowing water to be delivered into the brewing chamber; wherein the top part of the brewing chamber includes a push-off element disposed near a central portion of the top element, the push-off element bulging downwardly from the top part and providing a downwardly biasing force against the coffee pad to separate the coffee pad from the top part during removal of the coffee pad, and the outer seal extends around an outer perimeter of the top part; and, wherein the push-off element is substantially hemispherical in a stress-relieved state.

12. A coffee machine for use with coffee pads comprising:
a housing; and
a brewing chamber disposed within the housing for receiving coffee pads and being at least partially formed by a top part and a bottom part, the top part being formed as a single integral piece and having openings allowing water to be delivered into the brewing chamber,
wherein the top part of the brewing chamber includes an outer seal extending around an outer perimeter of the top part and a push-off element disposed near a central portion of the top element, the push-off element bulging downwardly from the top part and providing a downwardly biasing force against the coffee pad to separate the coffee pad from the top part during removal of the coffee pad, and the push-off element includes a star-shaped element having metal tongues arranged between the openings in the top part of the brewing chamber for entry of water.

13. The coffee machine for use with coffee pads comprising: a housing; a brewing chamber disposed within the housing for receiving coffee pads and being at least partially formed by a top part and a bottom part, the top part being formed as a single monolithic piece of elastic material, having an outer seal, and having openings allowing water to be delivered into the brewing chamber; and, wherein the top part has an elevated structure disposed on a side of the top part facing the brewing chamber and including circularly arranged ribs provided with gaps, the ribs being arranged concentrically and the gaps being offset with respect to one another in a radial direction, the openings being arranged in the gaps.

* * * * *

UNITED STATES PATENT AND TRADEMARK OFFICE
CERTIFICATE OF CORRECTION

PATENT NO. : 8,418,602 B2  Page 1 of 1
APPLICATION NO. : 10/587226
DATED : April 16, 2013
INVENTOR(S) : Magg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1879 days.

Signed and Sealed this
First Day of September, 2015

Michelle K. Lee
*Director of the United States Patent and Trademark Office*